Feb. 7, 1956  H. H. HILL  2,733,667
BREATHER PUMP FOR CLEANSING AND STERILIZING MILKING LINES
Filed Jan. 4, 1952
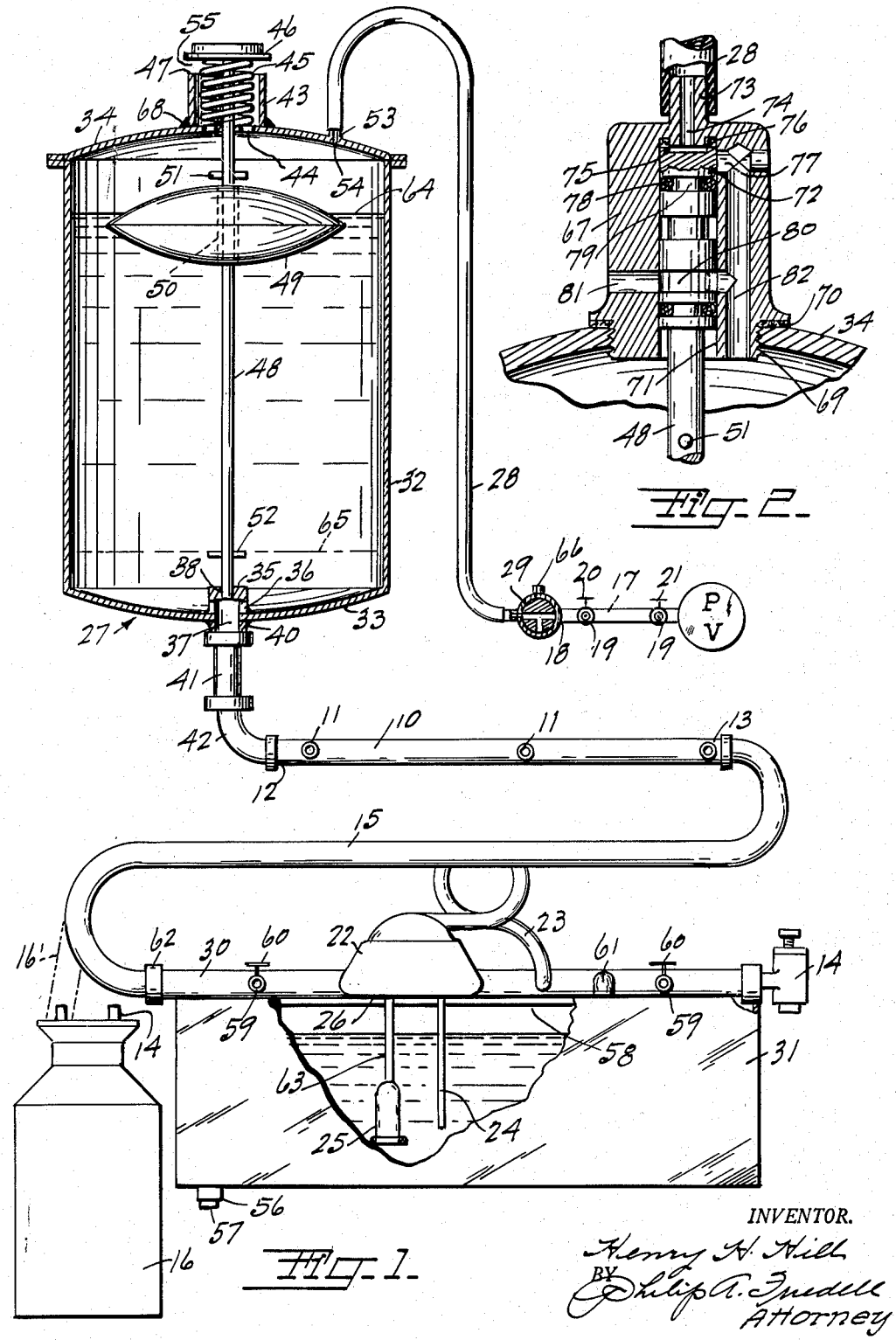
INVENTOR.
Henry H. Hill
BY Philip A. Iredell
Attorney United States Patent Office 2,733,667
Patented Feb. 7, 1956

2,733,667
BREATHER PUMP FOR CLEANSING AND STERILIZING MILKING LINES

Henry Horace Hill, Yreka, Calif.

Application January 4, 1952, Serial No. 265,006

2 Claims. (Cl. 103—236)

This invention relates to improvements in means for washing out and sterilizing milking machines and milking lines, and provides new and improved breather pump which is connected to the initial end of the milking line and to the vacuum line, with the discharge end of the line connected to a manifold to which the milking machines are connected and which are in communication with the cleansing and sterilizing solution through the teat cups, for simultaneously cleansing and sterilizing the milking machines and milk line, providing clean and bacteria-free apparatus for the next milking operation.

The washing and sterilizing operation is relatively rapid and simple and entirely automatic with the exception of that of starting and stopping operation of the apparatus and the mixing of the required solutions, and a continuous succession of cycles is maintained by this breather pump, each cycle consisting of passage of the solution in each direction through the milking machines and milk line, and when operation is terminated, the line and milking machines are completely drained ready for re-use.

The objects and advantages of the invention are as follows:

First, to provide pumping and solution storage apparatus for the initial end of the milking line and a solution tank for the discharge end, with the pumping apparatus operating in a continuous series of cycles each including the passage of the solution in respective directions through the milking circuit.

Second, to provide apparatus as outlined which is vacuum actuated for passage of the solution in one direction and which releases the solution for flow in the opposite direction by gravity.

Third, to provide apparatus as outlined which is of the utmost simplicity in construction and which operates automatically through a succession of cycles by a source of sub-atmospheric pressure and which is controlled by maximum and minimum levels of the solution in the apparatus for reversal of flow of solution.

In describing the invention reference will be had to the accompanying drawings, in which:

Fig. 1 is a sectional elevation through the vacuum actuated pumping and discharge apparatus or breather pump and showing the solution tank and a condensed view of the milking circuit.

Fig. 8 is an enlarged sectional elevation showing a modification of the control valve.

The conventional milking circuit includes a milking line 10 having a milking machine connection 11 for each milking stall, the unused connections being suitably sealed as by rubber caps or the like, and the initial end 12 of the line is normally sealed, with the discharge end 13 discharging through a suitable connection 15 into a container such as the milk can 16 as indicated at 16′.

A vacuum line 17 is normally sealed at the terminal end 18 and has the vacuum connections 19 for the milking machines and which are suitably controlled as by separate shut-off valves 20 and 21, the unused connections being closed, there being one of these connections to the milk can through the nipple 14 on the sealing cover.

The milking machines may be of any of the conventional types now available and is indicated at 22, having a milking line connection 23 which connects to one of the connections 11, while the other or vacuum connection 24 connects to the vacuum line 17 for the milking operation. Usually four teat cups 25 are provided on each milking machine, the machine being shown in inverted position, the top of the machine comprising the surface 26 which, for the washing operation forms the bottom.

This invention connects directly to the vacuum and milking lines without any change in these lines other than opening the initial end 12 of the milking line and connecting to the bottom of the breather pump and receiver, adding an extension 28 for connecting the terminal end of the vacuum line with the top of the breather pump and receiver, with interposed three-way valve 29, and transferring the discharge tube 15 from connection to the milk can to the manifold 30.

Since this invention is gravitationally operated in one direction, it is important that the circuit have a slight slope to the solution tank for complete drainage, and which is a normal requirement of such circuits.

The breather pump consists of a receiver having side walls 32, a bottom 33 and a head 34. A hub 35 has radial passages 36 in communication between the interior of the tank and the passage 37, this hub being provided with an axial bore 38 in the upper end to provide a sliding bearing for the actuating rod. The initial end of the milking line is connected to the lower hub 40 indicated at 41 and 42.

A valve housing 43 is fixed to the head 34, and passages 44 are provided through the head within the confines of the valve housing, and a compression spring 45 is supported on the head within the valve housing with the upper end of the spring cooperating with the underside of the valve 46 which seats on the top surface 47 of the valve housing. An actuating or valve rod 48 is fixed to the valve head 46 and operates slidably through a passage in the receiver head and within the bore 38. A float 49 is slidable on the rod 48 as indicated by the enlarged passage 50, and stops 51 and 52 are fixed to the upper and lower positions of this actuating rod for cooperation with the float.

A vacuum connection 53 is also provided in the head with the vacuum line connected thereto through the hose 28. The passage 54 is considerably smaller than the area of the passages 44 through the head or of the area of the space 55 between the top of the valve housing and the valve when the valve is open, and the spring 45 has just sufficient tension to maintain the valve open while supporting the weight of the valve and actuating rod. The relative areas of the vacuum passage and the air inlet should be in the neighborhood of 1:25 to prevent excessive suction to cause the valve to close, and sufficiently restricted to prevent hammer in the line when the air valve is closed by the float, and for conventional installations should not exceed ³⁄₁₆ inch diameter.

The air admission liquid check valve 14 is adjustable to admit a controlled volume of air into the solution for foaming and to increase the scouring action for more efficient cleaning, and greatly reduces the intensity of hammering in the line. In lieu thereof one of the valves 60 may be opened slightly to admit air during the cleaning operation.

The float 49 has sufficient buoyancy to lift the valve against the action of the reduced pressure, and sufficient weight at minimum liquid level to close the valve against the tension of the spring 45.

The solution tank 31 is provided with a discharge outlet 56 which is releasably sealed as by a plug 57 for discharge of the contents when the cleaning operation is completed.

Support means 58 is provided, preferably on the tank 31, for the milking machines, and a manifold 30 is preferably mounted on this tank and has connections 59 for the milking machines 22 and which are connected thereto through the milking connections 23, any unused connections 59 being sealed off by any suitable means such as valves 60.

For cleaning and sterilizing the milking line and milking machines, the milking machines are invertedly supported on the support means 26 as indicated, with the teat cups suspended into the solution and with the milking connections 23 attached to the respective connections 59, the remaining connections on the manifold being sealed off or having tubes 61 attached and extending down into the solution if more rapid transfer of solution is desired. The discharge connection 15 is removed from the milk can 16 and connected to the manifold at 62.

At this point the float is supported by the stop 52, the breather pump is empty, and the weight of the float has the air valve 46 closed. The valve 29 is now turned to the position shown and a vacuum is created in the breather pump 27, drawing the solution through the teat cups 25 and their connections 63, milking machines 22, manifold 30, discharge connection 15, milking line 10 through passage 36 into the breather pump and receiver 27, the float rising with the solution until it contacts the stop 51 at which point further rise of the solution causes the float to lift the valve 46 sufficiently to break the vacuum with the spring completing the lift. The solution now reverses and flows by gravity through the circuit back to the solution tank 31, with the float following the drop in level 64 until it again reaches the stop 52, and with further drop in the solution level, the weight of the float again closes the air valve to start another cycle, these cycles of operation continuing until the valve 29 as viewed in the drawing is manually turned clockwise through an angle of 90 degrees. This seals off the vacuum line and admits air to the receiver through the passage 66 to allow complete drainage of the solution back to the solution tank. The milking machines are then disconnected from the manifold and are then ready for use, the discharge connection 15 being disconnected from the manifold and reconnected to the milk can 16 or other milk receiver, and the vacuum line connected to the other nipple on the sealed milk can top.

The valve modification illustrated in Fig. 2 operates quite similarly to the one previously described with the exception that no spring is required, the vacuum line is shut off during the discharge section of each cycle and it substitutes for the spring. The same receiver, rod and float, and all connections previously described are used; this valve being merely substituted for valve 46, 47, and spring 45, and consists of a valve housing 67 which may be fixed to the head 34 of the receiver as indicated in Fig. 1 by welding indicated at 68, or may be threaded into the head as indicated at 69 with intervening gasket 70 to provide a tight seal. This housing has a valve bore 71 in which the valve 72 is slidable and which is fixed to the upper end of the actuating rod 48. A nipple 73 is formed as an extension at the upper end of the housing for connection of the vacuum line 28, and this nipple has a small bore 74 which for the average milk circuit and receiver 27 should not be larger than about 3/16 inch in diameter to prevent hammering in the line when the vacuum line is opened. A seat 75 is formed at the upper end of the valve bore 71 and may be provided with a resilient valve seat 76 for efficient sealing. A vacuum connection 77 is provided just below the valve seat and suitable sealing means such as an O-ring 78 is located in a groove 79 just below the connection 77 when the valve is in raised and closing position. An annular air passage 80 is formed in spaced relation below the O-ring 78, and an air passage is formed from the outside of the housing as indicated at 81 and extends into the valve bore in spaced relation below the annular passage 80 and into the other side of the housing in communication with the bore 82 which is in communication also with the bore 77 and with the upper end of the receiver as shown, and another sealing means such as the O-ring is provided below the air passage 81 as related to the raised valve.

In the position shown, the valve has been lifted by the float and the vacuum is acting on the upper end of the valve head to support the valve and rod while the solution flows out of the receiver, the passage 81 connecting through the annular passage 80 with the passage 82 to admit air to the receiver for rapid return flow of the solution through the circuit to the solution tank 31. Obviously the area of the valve head is to be made sufficient to support the actuating rod and valve, a half-inch diameter valve head being capable of supporting safely a weight of two pounds. With an actuating rod and valve of that weight, the float should weigh at least four pounds and possibly more to compensate for any friction of valve and sealing means, while very little buoyancy is required since only the immersed rod and the valve need be lifted.

As the solution flows out of the receiver back to the solution tank, the float follows, and when it engages the stop 52, its weight is applied, and as the solution recedes further, the weight of the float plus that of the rod and valve will draw the valve from its seat sufficiently to break the vacuum line for communication through the passage 77 and 82, following which further drop will close the air passage 81, under which conditions the air pressures on the respective ends of the rod are substantially identical, therefore the valve will remain in the lowered position until the solution again rises sufficiently to cause the float to again engage the stop 51 and lift the valve to vacuum line closing position.

I claim:

1. A breather pump comprising a tank having a head and a bottom, a passage provided in said bottom and a pipe connection therefor, a vacuum connection and a source of sub-atmospheric pressure for said head, and an air admission valve for said head comprising a valve housing terminating at its upper end in a valve seat, and a valve head cooperative with said valve seat and having a valve rod extending substantially to the bottom of said tank, said valve rod having an upper stop member and a lower stop member, and a spring within said valve housing and cooperative with said valve head for normally maintaining said air admission valve in open position, a float slidable on said valve rod and cooperative selectively with said upper and lower stop members for seating said valve when the weight of said float is applied to the lower stop member through discharge of the contents of the tank with said valve maintained closed through the medium of the existent sub-atmospheric pressure, and opening said valve to admit free air to break the vacuum through buoyancy of said float when the tank is substantially filled with fluid through the medium of sub-atmospheric pressure when said float engages and lifts said rod through said upper stop member to open said air admission valve, for discharge of the contents of the tank.

2. A breather pump comprising a tank having a head and a bottom, a passage provided in said bottom and a pipe connection therefor, a vertical sliding bearing provided interiorly on said bottom, a valve rod having its lower end slidable in said vertical sliding bearing and slidable through a bearing passage formed through said head, a valve head at the upper end of said valve rod, a valve housing projecting upwardly from said head and coaxial with said bearing passage and terminating at its upper end in a valve seat cooperative with said valve head, air passages formed through said head within the confines of said valve housing, a compression spring cooperative between said head and valve head within said valve housing for normally maintaining said valve open, a vacuum connection for said head, a float slidable on said valve rod, an upper stop member on said valve rod adjacent the upper end thereof and a lower stop member adjacent the lower end thereof, for cooperation with said float, the weight of said float in conjunction with the weight of said valve head and rod overcoming the tension of said spring to close said valve when liquid is substantially completely discharged from the tank with said float resting on said lower stop member and with sub-atmospheric pressure retaining said valve closed until said float through rise of solution in the tank engages said upper stop member and raises said valve to break the existent vacuum in the tank for discharge of the contents.

References Cited in the file of this patent

UNITED STATES PATENTS

| | | |
|---|---|---|
| 566,625 | Savorgnan | Aug. 25, 1896 |
| 1,645,356 | Shurts | Oct. 11, 1927 |
| 1,881,163 | Ayers | Oct. 4, 1932 |
| 2,213,069 | Engels et al. | Aug. 27, 1940 |
| 2,215,018 | Schmitt | Sept. 17, 1940 |
| 2,595,539 | Redman, Jr. | May 6, 1952 |

FOREIGN PATENTS

| | | |
|---|---|---|
| 584,032 | Great Britain | Jan. 6, 1947 |